US012006432B2

(12) United States Patent
Ramakrishnan et al.

(10) Patent No.: US 12,006,432 B2
(45) Date of Patent: Jun. 11, 2024

(54) IMPACT COMPOSITIONS

(71) Applicant: SHPP Global Technologies B.V., Bergen op Zoom (NL)

(72) Inventors: Vaidyanath Ramakrishnan, Bergen op Zoom (NL); Sepehr Harsiny, Bergen op Zoom (NL); Johannes Gerardus Petrus Goossens, Bergen op Zoom (NL); Johannes Martinus Dina Goossens, Bergen op Zoom (NL); Theodorus Lambertus Hoeks, Bergen op Zoom (NL); Devendra Bajaj, Mt. Vernon, IN (US); Pooja Bajaj, Selkirk, NY (US)

(73) Assignee: SHPP Global Technologies B.V., Bergen op Zoom (NL)

( * ) Notice: Subject to any disclaimer, the term of this patent is extended or adjusted under 35 U.S.C. 154(b) by 898 days.

(21) Appl. No.: 16/980,581

(22) PCT Filed: Mar. 11, 2019

(86) PCT No.: PCT/US2019/021560
§ 371 (c)(1),
(2) Date: Sep. 14, 2020

(87) PCT Pub. No.: WO2019/177939
PCT Pub. Date: Sep. 19, 2019

(65) Prior Publication Data
US 2021/0002479 A1    Jan. 7, 2021

Related U.S. Application Data

(60) Provisional application No. 62/643,268, filed on Mar. 15, 2018.

(30) Foreign Application Priority Data

Apr. 11, 2018  (EP) ..................................... 18166831

(51) Int. Cl.
*C08L 69/00*  (2006.01)
*C08G 77/448* (2006.01)
*C08K 9/06*   (2006.01)

(52) U.S. Cl.
CPC ............ *C08L 69/00* (2013.01); *C08G 77/448* (2013.01); *C08K 9/06* (2013.01); *C08K 2201/005* (2013.01); *C08K 2201/011* (2013.01); *C08L 2205/03* (2013.01)

(58) Field of Classification Search
CPC .... C08G 77/448; C08K 9/06; C08K 2201/11; C08K 2205/03; C08L 69/00; C08L 2205/03
See application file for complete search history.

(56) References Cited

U.S. PATENT DOCUMENTS

| 8,101,680 B1 * | 1/2012 | Ramakrishan ........... C08K 3/22 524/439 |
| 2009/0186208 A1 | 7/2009 | Ishikawa et al. |
| 2013/0261234 A1 | 10/2013 | Ma |
| 2014/0295363 A1 | 10/2014 | Sun et al. |
| 2015/0148465 A1 | 5/2015 | Chung et al. |

FOREIGN PATENT DOCUMENTS

| CN | 104672877 A | 6/2015 |
| EP | 1944337 A2 | 7/2008 |
| EP | 2878621 A1 | 6/2015 |
| WO | WO 2013/175448 A1 | 11/2013 |
| WO | WO 2014/072923 A1 | 5/2014 |

OTHER PUBLICATIONS

Uitert et al. "Subvoxel precise skeletons of volumetric data based on fast marching methods"; Medical Physics; vol. 34; Feb. 2007; p. 627-638 (abstract only).
AEROSIL® R972; Product Information: Application and Properties Physico-chemical Data; Areosil; accessed May 31, 2018; 2 pages.
International Patent Application No. PCT/US2019/021560; Invitation to Pay Add'l Fees; dated May 24, 2019; 17 pages.
International Patent Application No. PCT/US2019/021560; Int'l Written Opinion and Search Report; dated Aug. 23, 2019; 20 pages.
International Patent Application No. PCT/US2019/021560; Int'l Preliminary Report on Patentability; dated Sep. 24, 2020; 16 pages.
Odent et al.; "Mechanistic insights on nanosilica self-networking inducing ultra-toughness of rubber-modified polylactide-based materials"; Nanocomposites; vol. 1; 2015; p. 113-125.
Guild et al.; "Particle cavitation in rubber toughened epoxies: the role of particle size"; J Mater Sci; vol. 45; 2010; p. 3882-3894.

\* cited by examiner

*Primary Examiner* — Edward J Cain
(74) *Attorney, Agent, or Firm* — Quicker Law, LLC

(57) ABSTRACT

In an embodiment, a composition comprises a polycarbonate; 1 to 5 wt % based on a total weight of the composition of a nanosilica having a $D_{50}$ particle size by volume of 5 to 50 nanometers; wherein the nanosilica has a hydrophobic coating; and a siloxane domain having repeat units of the formula 10; wherein each R is independently a $C_{1-13}$ monovalent organic group and the value of E is 2 to 1,000; wherein the composition comprises at least one of a polycarbonate-polysiloxane copolymer, 0.1 to 5 wt % of a polysiloxane homopolymer based on the total weight of the composition, or a plurality of polysiloxane particles having a $D_{50}$ particle size by volume of 0.1 to 10 micrometers.

15 Claims, 7 Drawing Sheets

IMPACT COMPOSITIONS

CROSS-REFERENCE TO RELATED APPLICATION

This application is the National Stage of International Application No. PCT/US2019/021560 filed Mar. 11, 2019, which claims priority to and the benefit of U.S. Provisional Application Ser. No. 62/643,268 filed Mar. 15, 2018, and European Application Serial No. 18166831.0 filed on Apr. 11, 2018. The related applications are incorporated herein by this reference in their entireties.

BACKGROUND

Polycarbonate compositions can suffer from a loss in mechanical properties (such as impact or fatigue properties) when various components such as pigments, flame retardant, or mineral fillers are added. In order to compensate for the reduction in the mechanical properties, impact modifiers are often added. These impact modifiers though can cause an increase in the complexity of the polycarbonate compositions and can adversely affect other properties.

Polycarbonate compositions having improved mechanical properties that do not rely on the addition of impact modifiers are therefore desired.

BRIEF SUMMARY

Disclosed herein is a polycarbonate composition having improved impact properties.

In an embodiment, a composition comprises a polycarbonate; 1 to 5 wt % based on a total weight of the composition of a nanosilica having a $D_{50}$ particle size by volume of 5 to 50 nanometers; wherein the nanosilica has a hydrophobic coating; and a siloxane domain having repeat units of the formula 10; wherein each R is independently a $C_{1-13}$ monovalent organic group and the value of E is 2 to 1,000; wherein the composition comprises at least one of a polycarbonate-polysiloxane copolymer, 0.1 to 5 wt % of a polysiloxane homopolymer based on the total weight of the composition, or a plurality of polysiloxane particles having a $D_{50}$ particle size by volume of 0.1 to 10 micrometers. If present, the polysiloxane portion of the polycarbonate-polysiloxane copolymer constitutes at least a portion of the siloxane domain, the nanosilica is present in an amount of 2 to 5 wt %, and the value of E of formula (10) is 40 to 80, wherein the polycarbonate-polysiloxane copolymer can be the same or different as the polycarbonate. If present, the polysiloxane homopolymer constitutes at least a portion of the siloxane domain. If present, the plurality of polysiloxane particles constitutes at least a portion of the siloxane domain.

The above described and other features are exemplified by the following figures, detailed description, and claims.

BRIEF DESCRIPTION OF THE DRAWINGS

The following figures are exemplary embodiments, which are provided to illustrate the present disclosure. The figures are illustrative of the examples, which are not intended to limit devices made in accordance with the disclosure to the materials, conditions, or process parameters set forth herein.

DETAILED DESCRIPTION

Figure 1:
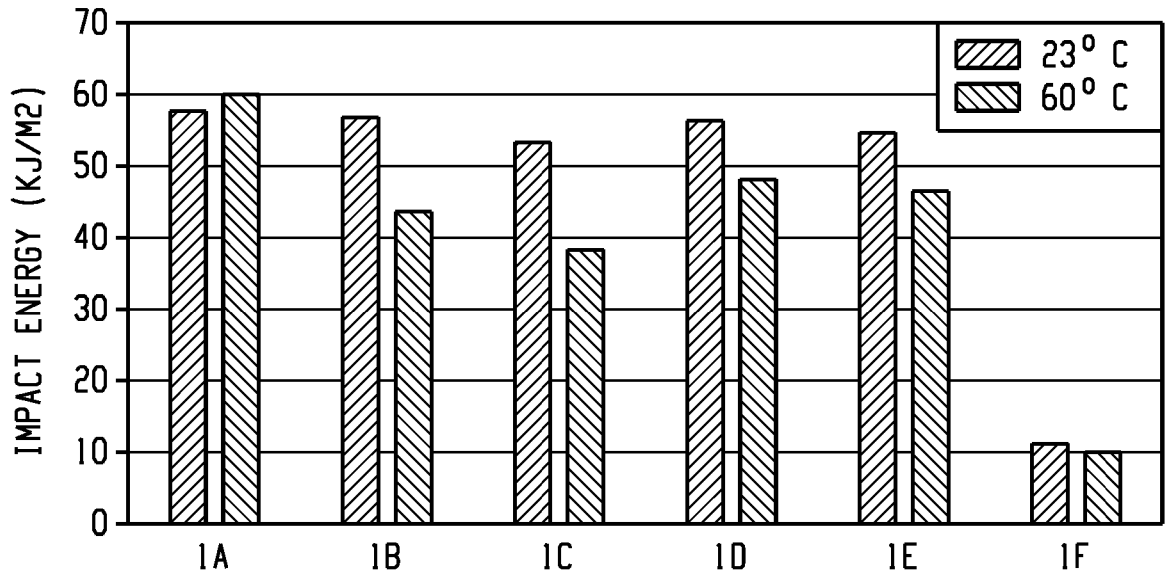
FIG. 1 is a graphical illustration of the notched Izod impact energy of the compositions of Example 1.

It was discovered that a surprising synergy arises in a composition comprising a polycarbonate, a nanosilica, and a siloxane domain in that the composition has an increased impact energy at 23 degrees Celsius (° C.) (such as one or both of a notched Izod impact energy and a multiaxial impact energy) as compared to the same composition but that is free of one of the nanosilica or the siloxane domain Without wishing to be bound by theory, it is believed that the increased impact energy arises due to the presence of the soft siloxane domains and the rigid nanosilica as the soft siloxane domains act to transfer stress during impact by acting as a spring and the rigid nanosilica can act to improve flow behavior, resulting in an improve melt flow.

"Polycarbonate" as used herein means a homopolymer or copolymer having repeating structural carbonate units of the formula (1)

wherein at least 60 percent of the total number of $R^1$ groups are aromatic, or each $R^1$ contains at least one $C_{6-30}$ aromatic group. Polycarbonates and their methods of manufacture are known in the art, being described, for example, in WO 2013/175448 A1, US 2014/0295363, and WO 2014/072923. Polycarbonates are generally manufactured from bisphenol compounds such as at least one of 2,2-bis(4-hydroxyphenyl) propane ("bisphenol-A" or "BPA"), 3,3-bis(4-hydroxyphenyl) phthalimidine, 1,1-bis(4-hydroxy-3-methylphenyl)cyclohexane, or 1,1-bis(4-hydroxyphenyl)-3,3,5-trimethylcyclohexane (isophorone).

The polycarbonate can comprise a homopolymer derived from BPA. The polycarbonate can comprise a copolymer derived from BPA and another bisphenol or dihydroxy aromatic compound such as resorcinol. The polycarbonate can comprise a copolymer derived from BPA and optionally another bisphenol or dihydroxyaromatic compound, and further comprising non-carbonate units, for example aromatic ester units such as resorcinol terephthalate or isophthalate, aromatic-aliphatic ester units based on $C_{6-20}$ aliphatic diacids, polysiloxane units such as polydimethylsiloxane units, or a combination comprising at least one of the foregoing. The polycarbonate can comprise a poly(ester-carbonate-siloxane) copolymer comprising bisphenol A carbonate units, isophthalate-terephthalate-bisphenol A ester units, and siloxane units, wherein the siloxane units can comprise blocks containing 5 to 200 dimethylsiloxane units. Examples of a poly(ester-carbonate-siloxane) copolymer are those commercially available under the trade name FST from SABIC's Innovative Plastic Business. When the polycarbonate comprises siloxane repeat units, then these siloxane units can constitute at least part of the siloxane domain.

The polycarbonate can have a weight average molecular weight of 10,000 to 50,000 grams per mole (g/mol), or 20,000 to 40,000 g/mol based on polycarbonate standards. The composition can comprise 60 to 90 weight percent (wt %), or 65 to 75 wt % of the polycarbonate based on the total weight of the composition.

The composition comprises nanosilica. The nanosilica can have a hydrophobic coating. The nanosilica can comprise a solid silica. The nanosilica can comprise at least one of a fused silica or a fumed silica. The nanosilica can comprise at least one of a crystalline silica or an amorphous silica. Examples of solid silica include attapulgite, e.g., Min-U-Gel™ commercially available from Active Minerals International, Ultrasil™ commercially available from Degussa Corporation, and Davisil™-643 commercially available from Sigma-Aldrich. The nanosilica can comprise a high purity nanosilica, where 'high purity nanosilica' is a nanosilica that comprises greater than or equal to 70 wt %, or greater than or equal to 80 wt %, or 90 to 100 wt % of silica oxide, based on the total weight of the nanosilica. The nanosilica can have a $D_{50}$ particle size by volume of 5 to 50 nanometers (nm), or 5 to 40 nm, or 15 to 25 nm. The composition can comprise 2.5 to 4.5 wt %, or 3 to 4 wt % of the nanosilica based on the total weight of the composition.

The hydrophobic coating can comprise at least one of an organosiloxane or an organosilane. The organosiloxane can comprise at least one of an oligomeric linear siloxane (such as polydimethylsiloxane or polyphenylmethylsiloxane) or a cyclic siloxane (such as octamethyltetrasiloxane or hexamethyltrisiloxane). The hydrophobic coating can comprise a polysiloxane graft that can be comprise an organosiloxane (such as polydimethylsiloxane) grafted onto a surface of the nanosilica. The organosilane can comprise at least one of phenyltrimethoxysilane, diphenyldimethoxysilane, polyethyleneglycoltrimethoxysilane, phenethyltrimethoxysilane, gamma-methacryloxypropyltrimethoxysilane, gamma-aminopropyltrimethoxysilane, glycidyloxypropyltrimethoxysilane, N-aminoethyl-3-aminopropyltrimethoxysilane, aminoethylaminopropylmethyldimethoxysilane, aminoethylaminopropyltrimethoxysilane, methyltrimethoxysilane, methyltriethoxysilane, mercaptopropyltrimethoxysilane, mercaptopropylmethyldimethoxysilane, chloropropyltrimethoxysilane, chloropropyltriethoxysilane, phenyltriethoxysilane, chloropropylmethyldimethoxysilane, diphenyldiethoxysilane, phenyltriethoxysilane, polyethyleneglycoltriethoxysilane, gamma-methacryloxypropyltriethoxysilane, gamma-aminopropyltriethoxysilane, glycidyloxypropyltriethoxysilane, or N-aminoethyl-3-aminopropyltriethoxysilane. The hydrophobic coating component can be added to the silica prior to or during formation of the composition.

The composition comprises a siloxane domain. The composition can comprise 0.1 to 15 wt %, or 0.1 to 10 wt %, 0.1 to 2 wt %, or 3 to 15 wt %, or 2 to 6 wt % of the siloxane domain based on the total weight of the composition. The siloxane domain can have an average maximum diameter as determined by image analysis of atomic force microscopy images of greater than or equal to 500 nm, or 500 to 5,000 nm, or 600 to 2,000 nm, where the diameter is the diameter of a circle having the same area as the area of the siloxane domain. The siloxane domain comprises blocks having repeating units of the formula (10), wherein each R is independently a $C_{1-13}$ monovalent organic group. For example, R can be a $C_{1-13}$ alkyl, $C_{1-13}$ alkoxy, $C_{2-13}$ alkenyl, $C_{2-13}$ alkenyloxy, $C_{3-6}$ cycloalkyl, $C_{3-6}$ cycloalkoxy, $C_{6-14}$ aryl, $C_{6-10}$ aryloxy, $C_{7-13}$ arylalkyl, $C_{7-13}$ aralkoxy, $C_{7-13}$ alkylaryl, or $C_{7-13}$ alkylaryloxy. The foregoing groups can be fully or partially halogenated with fluorine, chlorine, bromine, or iodine, or a combination thereof. The R can be unsubstituted by halogen. Combinations of the foregoing R groups can be used in the same copolymer.

(10)

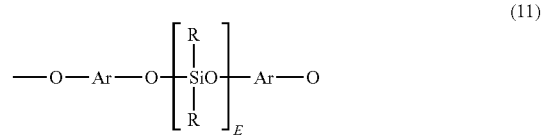

(11)

The value of E in formula (10) can vary widely depending on the type and relative amount of each component in the composition, the desired properties of the composition, and like considerations. Generally, E has an average value of 2 to 1,000, or 2 to 500, or 2 to 200, or 2 to 125, 5 to 80, or 10 to 70. E can have an average value of 10 to 80, or 10 to 40, or 40 to 80, or 40 to 70. If the composition comprises a polycarbonate-polysiloxane copolymer then, where E is of a lower value, e.g., less than 40, it can be desirable to use a relatively larger amount of the polycarbonate-polysiloxane copolymer. Conversely, where E is of a higher value, e.g., greater than 40, a relatively lower amount of the polycarbonate-polysiloxane copolymer can be used. It is noted that the siloxane domain as defined by formula (10) is in formulae (11)-(14) and (I) defined below.

The siloxane domain can arise from the presence of a polysiloxane polymer. The polysiloxane polymer comprises at least one of a polysiloxane homopolymer and a polysiloxane copolymer. If the polysiloxane copolymer comprises carbonate repeat units, then the polysiloxane copolymer and the polycarbonate can be considered as the same component, where the siloxane domain arises from the siloxane blocks of the polycarbonate-polysiloxane copolymer. The siloxane domain can comprise repeat units of formula (11), wherein E is as defined above; each R can be the same or different, and is as defined above; and Ar can be the same or different, and is a substituted or unsubstituted $C_{6-30}$ arylene, wherein the bonds are directly connected to an aromatic moiety. Ar groups in formula (11) can be derived from a $C_{6-30}$ dihydroxyarylene compound. Examples of dihydroxyarylene compounds are 1,1-bis(4-hydroxyphenyl) methane, 1,1-bis (4-hydroxyphenyl) ethane, 2,2-bis(4-hydroxyphenyl) propane, 2,2-bis(4-hydroxyphenyl) butane, 2,2-bis(4-hydroxyphenyl) octane, 1,1-bis(4-hydroxyphenyl) propane, 1,1-bis(4-hydroxyphenyl) n-butane, 2,2-bis(4-hydroxy-1-methylphenyl) propane, 1,1-bis(4-hydroxyphenyl) cyclohexane, bis(4-hydroxyphenyl sulfide), and 1,1-bis(4-hydroxy-t-butylphenyl) propane. Combinations comprising at least one of the foregoing dihydroxy compounds can also be used.

The siloxane domain can comprise repeat units of formula (13), wherein R and E are as described above, and each $R^5$ is independently a divalent $C_{1-30}$ organic group, and wherein the polymerized polysiloxane unit is the reaction residue of its corresponding dihydroxy compound.

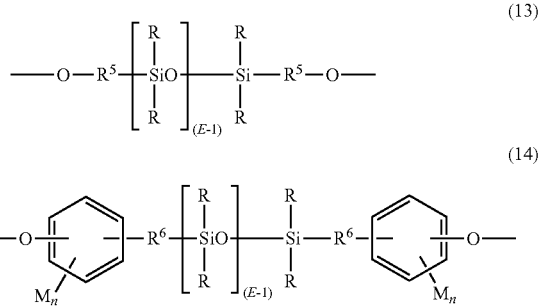

The siloxane domain can comprise repeat units of formula (14), wherein R and E are as defined above. $R^6$ in formula (14) is a divalent $C_{2-8}$ aliphatic. Each M in formula (14) can be the same or different, and can be a halogen, cyano, nitro, $C_{1-8}$ alkylthio, $C_{1-8}$ alkyl, $C_{1-8}$ alkoxy, $C_{2-8}$ alkenyl, $C_{2-8}$ alkenyloxy, $C_{3-8}$ cycloalkyl, $C_{3-8}$ cycloalkoxy, $C_{6-10}$ aryl, $C_{6-10}$ aryloxy, $C_{7-12}$ aralkyl, $C_{7-12}$ aralkoxy, $C_{7-12}$ alkylaryl, or $C_{7-12}$ alkylaryloxy, wherein each n is independently 0, 1, 2, 3, or 4.

M can be bromo or chloro, an alkyl (such as methyl, ethyl, or propyl), an alkoxy (such as methoxy, ethoxy, or propoxy), or an aryl (such as phenyl, chlorophenyl, or tolyl); $R^6$ can be a dimethylene, trimethylene, or tetramethylene; and R can be a $C_{1-8}$ alkyl, haloalkyl (such as trifluoropropyl or cyanoalkyl), or aryl (such as phenyl, chlorophenyl, or tolyl). R can be methyl, or a combination of methyl and trifluoropropyl, or a combination of methyl and phenyl. R can be methyl, M can be methoxy, n can be one, and $R^6$ can be a divalent $C_{1-3}$ aliphatic group.

Specific polydiorganosiloxane blocks are of the formula (14a), (14b), and (14c).

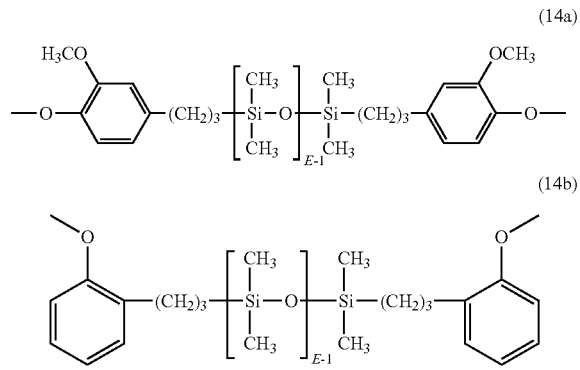

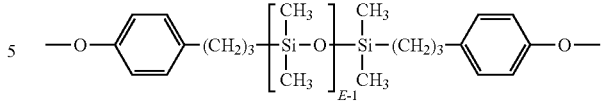

The siloxane domain can comprise a polysiloxane homopolymer having repeat units of formula (10). The polysiloxane homopolymer can comprise a polydimethylsiloxane. The composition can comprise 0.1 to 10 wt %, or 0.1 to 5 wt %, or 0.1 to 3 wt %, or 0.5 to 1.5 wt % of the polysiloxane homopolymer based on the total weight of the composition.

The siloxane domain can arise due to the presence of a polycarbonate-polysiloxane copolymer. The polycarbonate-polysiloxane copolymer can have a value of E of the formula (10) of 40 to 80. The composition can comprise 10 to 40 wt %, or 25 to 35 wt %, or 25 to 40 wt % of the polycarbonate-polysiloxane copolymer based on the total weight of the composition.

The composition can comprise a plurality of polysiloxane particles. The composition can comprise 1 to 10 wt %, or 2 to 6 wt % of the plurality of polysiloxane particles based on the total weight of the composition. The polysiloxane particles can be in the shape of at least one of spherical, oblong, ovoid, or cylindrical. Specifically, the polysiloxane particles can be spherical in shape. The polysiloxane particles can have a $D_{50}$ particle size by volume of 0.1 to 10 micrometers, or 1 to 5 micrometers. As used herein, the $D_{50}$ particle size can be determined in accordance with ISO-22412-17. The bulk specific gravity of the polysiloxane particles can be 0.35 to 0.67 kilograms per liter (kg/L).

The polysiloxane particles can comprise a three-dimensional polymer chain of the formula (I)

$$R_xSiO_{2-(x/2)} \qquad (I)$$

in which x is a positive number greater than or equal to 1, or 1 to 1.9, or 1 to 1.5, or 1 to 1.2; and each R is independently is defined above. R in formula (I) can be an aliphatic hydrocarbon group (such as methyl, ethyl, or butyl) or an aromatic hydrocarbon (such as phenyl). R in formula (I) can comprise an unsaturated group (such as vinyl).

R can be a hydrocarbon group having 1 to 8, or 1 to 5, carbon atoms. The polysiloxane particles can have a methylated coating, wherein R is methyl. Specifically mentioned polysiloxane particles comprise methylsilsesquioxane particles.

The polysiloxane particles can have the formula (II).

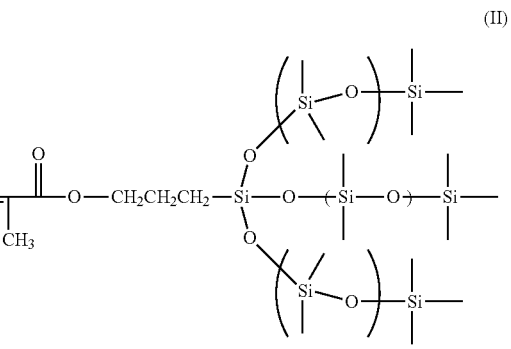

Suitable polysiloxane particles are "Tospearl" silicone resin particles commercially available from Momentive Performance Materials Japan LLC, E+ Spherical Silicone Resins commercially available from Coating Products OHZ e.K. of Osterholz-Scharmbeck, or E-Powders commercially available from Dow Corning. These particles can have a three-dimensional network structure, in which each silicone atom is bonded to one methyl group.

An additive composition can be used, comprising one or more additives selected to achieve a desired property, with the proviso that the additive(s) are also selected so as to not significantly adversely affect a desired property of the thermoplastic composition. The additive composition or individual additives can be mixed at a suitable time during the mixing of the components for forming the composition. The additive can be soluble or non-soluble in polycarbonate. The additive composition can include at least one of a flame retardant, flow modifier, filler (e.g., a particulate polytetrafluoroethylene (PTFE), glass, carbon (such as carbon black, carbon nanotubes, or carbon fibers), mineral (such as titanium dioxide, optionally comprising a coating), or metal), reinforcing agent (e.g., glass fibers), antioxidant, heat stabilizer, light stabilizer, ultraviolet (UV) light stabilizer, UV absorbing additive, plasticizer, lubricant, release agent (such as a mold release agent), antistatic agent, anti-fog agent, antimicrobial agent, colorant (e.g., a dye or pigment), surface effect additive, or radiation stabilizer. The composition can comprise at least one of a carbon filler and titanium dioxide. In general, the additives are used in the amounts generally known to be effective. For example, the total amount of the additive composition (other than any impact modifier, filler, or reinforcing agent) can be 0.001 to 10 wt %, or 0.01 to 5 wt %, each based on the total weight of the polymer in the composition.

The composition can comprise a plurality of carbon nanotubes. The composition can comprise 2 to 10 wt % of a plurality of carbon nanotubes based on the total weight of the composition.

The carbon nanotubes can comprise a plurality of at least one of single wall carbon nanotubes (SWNTs) or multiwall carbon nanotubes (MWNTs). The carbon nanotubes can be produced by laser-evaporation of graphite or carbon arc synthesis. The carbon nanotubes can have an outer diameters of 0.7 to 2.4 nm. The carbon nanotubes can have an aspect ratio (length over outer diameter) of greater than or equal to 5 to 10,000, or greater than or equal to 100, or greater than or equal to 1,000. The carbon nanotubes can have a hollow central portion or the central portion can be filled with amorphous carbon.

The carbon nanotubes can be present in the form of rope-like-aggregates. These aggregates are commonly termed "ropes" and are formed as a result of Van der Waal's forces between the individual carbon nanotubes. The individual nanotubes in the ropes can slide against one another and rearrange themselves within the rope in order to minimize the free energy. The ropes can comprise 10 and $10^5$ nanotubes, or 100 to $10^4$, or 500 to $10^3$. The ropes can have an aspect ratio (length over outer diameter) of greater than or equal to 5 to 10,000, or greater than or equal to about 100, or greater than or equal to 1,000.

The carbon nanotubes can have an inherent thermal conductivity of at least 2,000 Watts per meter Kelvin (W/m-K). The carbon nanotubes can have an inherent electrical conductivity of $10^4$ Siemens/centimeter (S/cm). The carbon nanotubes can have a tensile strength of at least 80 gigapascals (GPa). The carbon nanotubes can have a stiffness of 0.5 terapascals (TPa).

The carbon nanotubes can be functionalized to improve compatibility in the composition. The carbon nanotubes can be functionalized on at least one of a sidewall or a hemispherical endcap. The carbon nanotubes can be functionalized with a reactive group (such as a hydroxyl group or an amine group) that can react with a terminal group of at least one of a polycarbonate or a polysiloxane. The carbon nanotubes can be functionalized by contacting the carbon nanotubes with a strong oxidizing agent for a period of time sufficient to oxidize the surface of the carbon nanotubes and further contacting the carbon nanotubes with a reactant suitable for adding a functional group to the oxidized surface. The oxidizing agent can comprise a solution of an alkali metal chlorate in a strong acid. The alkali metal chlorate can comprise at least one of sodium chlorate or potassium chlorate. The strong acid can comprise sulfuric acid. Periods of time sufficient for oxidation can be 0.5 to 24 hours.

The composition can comprise a fluoropolymer. The composition can comprise 0.1 to 5 wt %, or 0.5 to 4, or 0.5 to 3 wt % of the fluoropolymer based on the total weight of the composition. The fluoropolymer can be a homopolymer or a copolymer that can comprise structural units derived from one or more fluorinated alpha-olefin monomers, that is, an alpha-olefin monomer that includes at least one fluorine atom in place of a hydrogen atom. The fluoropolymer can comprise structural units derived from two or more fluorinated alpha-olefin, for example, tetrafluoroethylene or hexafluoroethylene. The fluoropolymer can comprise structural units derived from one or more fluorinated alpha-olefin monomers or one or more non-fluorinated monoethylenically unsaturated monomers that are copolymerizable with the fluorinated monomers, for example, alpha-monoethylenically unsaturated copolymerizable monomers such as ethylene, propylene, butene, acrylate monomers (e.g., methyl methacrylate or butyl acrylate), or vinyl ether monomers (e.g., cyclohexyl vinyl ether, ethyl vinyl ether, n-butyl vinyl ether, or vinyl ester). Specific examples of fluoropolymers include a polytetrafluoroethylene, a polyhexafluoropropylene, a poly(vinylidene fluoride), a polychlorotrifluoroethylene, an ethylene tetrafluoroethylene copolymer, a fluorinated ethylene-propylene copolymer, a poly(vinyl fluoride), or an ethylene chlorotrifluoroethylene copolymer. Combinations comprising at least one of the foregoing fluoropolymers can also be used. The fluoropolymer can comprise at least one of polytetrafluoroethylene, polyhexafluoropropylene, polyvinylidene fluoride, polychlorotrifluoroethylene, ethylene tetrafluoroethylene, fluorinated ethylene-propylene, polyvinyl fluoride, or ethylene chlorotrifluoroethylene. The fluoropolymer can comprise polytetrafluoroethylene (PTFE).

At least a portion of the fluoropolymer can comprise an encapsulated fluoropolymer that is encapsulated with an encapsulating polymer. The encapsulating polymer can comprise at least one of an acrylic polymer, an acrylonitrile butadiene styrene (ABS) resin, an aromatic polyester, a ($C_{1-8}$ alkyl) (meth)acrylates, an ethylene propylene copolymer, an ethylene-vinyl acetate copolymer, a liquid crystalline polymer, a polyacetal, a polyacrylonitrile, a poly(alkenyl aromatic) polymer, a polyamide, a polybutadiene, a polycarbonate, a polyester, a polyetherimide, a polyether ketone, a polyether ether ketone, a polyethersulfone, a polyimide, a polyphenylene ether, a polyolefin, a polyphenylene ether, a polyphenylene sulfide, a polysiloxane, a polystyrene, a polysulfone, a polyurethane, a polyvinylidene halide, or a vinyl polymer (e.g., poly(vinyl alcohol), poly(vinyl acetate), or poly(vinyl fluoride)). The encapsulating polymer can comprise at least one of a styrene-acrylonitrile copolymer, an acrylonitrile-butadiene-styrene copolymer, an alpha-alkyl-styrene-acrylonitrile copolymer, an alpha-methylstyrene-acrylonitrile copolymer, a styrene-butadiene rubber, or a methyl methacrylate copolymer. The encapsulating polymer can comprise a styrene-acrylonitrile copolymer.

The encapsulated fluoropolymer can be encapsulated with a rigid copolymer, for example, a styrene-acrylonitrile copolymer (SAN). PTFE encapsulated in SAN is known as TSAN. Encapsulated fluoropolymers can be made by polymerizing the encapsulating polymer in the presence of the fluoropolymer, for example, in an aqueous dispersion. The TSAN can comprise 40 to 60 wt % PTFE and 40 to 60 wt % SAN, based on the total weight of the encapsulated fluoropolymer. The SAN can comprise, for example, 60 to 80 wt % styrene and 20 to 40 wt % acrylonitrile based on the total weight of the SAN copolymer. Alternatively, the fluoropolymer can be pre-blended in some manner with a second polymer, such as for example, an aromatic polycarbonate or SAN to form the encapsulated fluoropolymer.

The composition can comprise the encapsulated fluoropolymer in the form of a fibrillated fluoropolymer. The fibrillated fluoropolymer can have an average fibril diameter of greater than or equal to 20 nm, or 20 to 200 nm, or 5 to 500 nm, or 10 to 200 nm, or 20 to 100 nm. The fibril diameter can be determined by using acquired SEM images, in a batch processing manner over all images after de-noising and normalization. Firstly, the fiber detection can be performed with a fixed threshold on the pre-processed images, which changes the original gray-level images to binary images. To evade the fiber entanglement, regional analysis can be conducted instead of separating the individual fiber branches from fiber networks. The inner-boundary distance can be calculated for each region covered by the detected fibers. In the images, the distance can grow from the edge of the detected region towards the nearest nonzero pixels in the binary image based on Fast Marching Method (FMM) (R. van Uitert and I. Bitter, Medical Physics, 34 (2), 2007), where the distance is initiated as zero at the edge and penetrated with the Euclidean distance growing (D= $\sqrt{(x-y)^2}$) towards the next neighbor. Based on the distance map, the centerline of each of the branches can be derived, which can be located at local maxima of the distance map. As such, the crossings of fibers can also be identified as the connection of different branches. The width of each branch can then be calculated along the centerlines over the distance map, avoiding the crossings.

The composition can have a notched Izod impact energy of greater than or equal to 30 kilojoules per meter squared ($kJ/m^2$), or 30 to 70 $kJ/m^2$ at $-60°$ C. As used herein, the notched Izod impact energy is determined in accordance with ISO 180-1A:2000(en) using a 4 millimeter (mm) thick, molded notched Izod impact bar.

The composition can have an increased notched Izod impact energy as compared to the same composition but that does not comprise both the siloxane domain and the nanosilica. The composition can have a notched Izod impact energy of greater than or equal to 30 $kJ/m^2$, or greater than or equal to 35 $kJ/m^2$, or 50 to 70 $kJ/m^2$ at $23°$ C. If the composition comprises that polycarbonate-polysiloxane copolymer, then composition can have a notched Izod impact energy of greater than or equal to 50 $kJ/m^2$, or 50 to 70 $kJ/m^2$ at $23°$ C. When the composition comprises the encapsulated fluoropolymer, the composition can have an increased notched Izod impact as compared to the notched Izod impact of the same composition but without the encapsulated fluoropolymer. The composition can have a notched Izod impact of greater than or equal to 15 $kJ/m^2$ or greater than or equal to 17 $kJ/m^2$, or 17 to 70 $kJ/m^2$ at $23°$ C.

The composition can have a multiaxial impact energy of greater than or equal to 90 Joules (J), or 90 to 120 J, or 95 to 120 J determined at $23°$ C. in accordance with ISO 6603-2:2000.

The composition can have a tensile modulus of greater than or equal to 2,250 megapascal (MPa), or 2,250 to 2,350 MPa. When the composition comprises the encapsulated fluoropolymer, the composition can have an increased tensile modulus as compared to the tensile modulus of the same composition but without the encapsulate fluoropolymer. The composition can have a tensile modulus of greater than or equal to 2,650 megapascal (MPa), or 2,650 to 3,100 MPa.

The composition can be free of (for example, can comprise 0 to 0.1 wt %, or 0 wt % based on the total weight of the composition) an impact modifier. For example, the composition can be free of natural rubber, fluoroelastomers, ethylene-propylene rubber (EPR), ethylene-butene rubber, ethylene-propylene-diene monomer rubber (EPDM), acrylate rubbers, hydrogenated nitrile rubber (HNBR), silicone elastomers, styrene-butadiene-styrene (SBS), styrene-butadiene rubber (SBR), styrene-(ethylene-butene)-styrene (SEBS), acrylonitrile-butadiene-styrene (ABS), acrylonitrile-ethylene-propylene-diene-styrene (AES), styrene-isoprene-styrene (SIS), styrene-(ethylene-propylene)-styrene (SEPS), methyl methacrylate-butadiene-styrene (MBS), high rubber graft (HRG), and the like.

The following examples are provided to illustrate the present disclosure. The examples are merely illustrative and are not intended to limit devices made in accordance with the disclosure to the materials, conditions, or process parameters set forth therein.

EXAMPLES

In the examples, the notched Izod impact energy was determined in accordance with ISO 180-1A:2000(en) at the temperatures specified using a 4 mm thick, molded notched Izod impact bar.

The multiaxial impact (MAI) energy at maximum load was determined in accordance with ISO 6603-2:2000.

In order to prepare the samples for atomic force microscopy, samples were cut to size and the cross-section of the samples was cryo-microtomed at $-140°$ C. using microtoming equipment (LEICA EM UC7) to obtain a flat cross-sectional surface. A diamond knife (Diatome) mounted in a stainless steel holder was used for microtoming the samples. After cryo-microtoming, the microtomed blocks were used for AFM measurements directly without further treatment.

AFM measurements were performed using a Dimension FastScan AFM system (Dimension FastScan, Bruker, Santa Barbara, USA). Nanoscope Analysis software, version 1.5, from Bruker was used as computer interface for operation and analysis of AFM measurements. All AFM measurements were performed at ambient conditions with tapping mode imaging utilizing tapping mode tips (Model RTESP, k:40 Newtons per meter (N/m), f:300 kilohertz (kHz)). Height and phase images were recorded simultaneously at a scan rate of 1 Hertz (Hz) with a resolution of 512×512 pixels.

Crack propagation studies were performed using single edge notch beams (SENB) according to ASTM D6068-10. Specimens with rectangular geometry (12 mm×24 mm×120 mm) were injection molded using a 180-ton DEMAG injection molding machine. All specimens were notched using an end mill cutter (tip angle=60°; radius=250 micrometers) to approximately 12 mm depth and subsequently sharpened with a razor blade (radius=20 micrometers) to obtain single edge notched beams (SENB). The single edge notched beams (SENB) were tested under 3-point bend configuration. All tests were carried out on an INSTRON-E3000 universal test system under displacement control (1.5 millimeters per minute (mm/min)) at room temperature (23° C.). The load, load-line displacement and crack mouth opening displacement (CMOD; also called COD) was continually captured throughout the duration of the test. CMOD was captured via INSTRON 2D video extensometer (Fujinon 35 mm). Crack length (a) was calculated using a compliance technique and total energy to fracture (J) was calculated according to ASTM-D6068-10.

Fatigue testing was conducted according to ASTM E647-15e1 on single edge notch beams at a load ratio ($P_{min}/P_{max}$) of 0.2 and frequency of 5 Hertz. A maximum compressive load of 320 Newtons was applied and number of cycles to failure was recorded.

The materials listed in Table 1 were used in the below examples.

TABLE 1

| Material | Description | Source |
| --- | --- | --- |
| PC125 | BPA homopolycarbonate having a Mw of 23,300 g/mol with a melt volume flow rate of 22.6 to 19.5 cm³/10 min (ISO 1133: 2005, 300° C., 1.2 kg) | SABIC's Innovative Plastics business |
| PC175 | BPA homopolycarbonate having a Mw of 21,800 g/mol with a melt volume flow rate of 32.8 to 26.9 cm³/10 min (ISO 1133: 2005, 300° C., 1.2 kg | SABIC's Innovative Plastics business |
| PC-PSi | BPA-PDMS copolymer having a D-45 siloxane block length | SABIC's Innovative Plastics business |
| Polysiloxane | Silicone oil SF96-100 PDMS | Momentive Performance Materials GmbH |
| FST3403 | DAC-resorcinol-siloxane-BPA based grade 0.9 wt % | SABIC's Innovative Plastics business |
| Nanosilica | CAB-O-SIL TS-720, a fumed silica coated with poly(dimethyl siloxane) having an average particle size of 20 nanometers | Cabot Corporation |
| SP-TOS-2 | Polysiloxane particles, Tospearl 120FL having particle size of 2 micrometers and a surface area of 2.27 meters squared per gram (m²/g) | Momentive Performance Materials |
| SP-TOS-3 | Polysiloxane particles, Tospearl 130FL having particle size of 3 micrometers and a surface area of 1.52 m²/g | Momentive Performance Materials |
| SP-TOS-4.5 | Polysiloxane particles, Tospearl 145FL having particle size of 4.5 micrometers and a surface area of 1.01 m²/g | Momentive Performance Materials |
| SP-XC-0.7 | Polysiloxane particles, XC99-A8808 having particle size of 0.7 micrometers and a surface area of 6.49 m²/g | Momentive Performance Materials |
| SP-E-0.8 | Polysiloxane particles, E+508 having particle size of 0.8 micrometers and a surface area of 5.68 m²/g | Coating Products |
| SP-E-2 | Polysiloxane particles, E+520 having particle size of 2 micrometers and a surface area of 2.27 m²/g | Coating Products |
| SP-E-4 | Polysiloxane particles, E+540 having particle size of 4 micrometers and a surface area of 1.14 m²/g | Coating Products |
| SP-E-15 | Polysiloxane particles, E+715 having particle size of 15 micrometers and a surface area of 0.30 m²/g | Coating Products OHZ e.K. |
| SP-30-1-3 | Polysiloxane particles, 30-424 having particle size of 1 to 3 micrometers and a surface area of 4.55 to 1.52 m²/g | Dow Corning |
| Irgaphos | Heat stabilizer, tris(2,4-di-t-butylphenyl) phosphate | BASF/Ciba Specialty Chemicals |
| PTFE | Algoflon DF Virgin-DF210 | Solvay Specialty Polymers |
| TSAN | PTFE encapsulated in SAN (50 wt % PTFE and 50 wt % SAN based on the total weight of the TSAN) | SABIC's Innovative Plastics business |
| Carbon nanotubes | Fibril ™ Nanotubes | Hyperion Catalysis International |

The polysiloxane particles from Momentive have a methylated coating, the polysiloxane particles from Coating Product have a methoxy coating, and the polysiloxane particles from Dow have a chemical formula (II).

Example 1: Effect of Nanosilica on Impact Energy of Compositions Comprising the Polycarbonate-Polysiloxane Copolymer Six compositions were prepared according to Table 2 and impact tests were performed on each of the examples. In Table 2, the siloxane wt % from the polysiloxane in the PC-PSi copolymer is provided based on the total weight of the composition. The results are shown in FIG. 1 and FIG. 2 for the notched Izod and multiaxial impact testing, respectively.

TABLE 2

| Composition | 1A | 1B | 1C* | 1D | 1E | 1F |
|---|---|---|---|---|---|---|
| PC175 (wt %) | 69.95 | 68.95 | 66.95 | 49.95 | 48.95 | 99.95 |
| PC-PSi (wt %) | 30 | 30 | 30 | 50 | 50 | — |
| Nanosilica (wt %) | — | 1 | 3 | — | 1 | — |
| Irgaphos (wt %) | 0.05 | 0.05 | 0.05 | 0.05 | 0.05 | 0.05 |
| Siloxane (wt %) | 9 | 9 | 9 | 15 | 15 | 0 |

Figure 2:
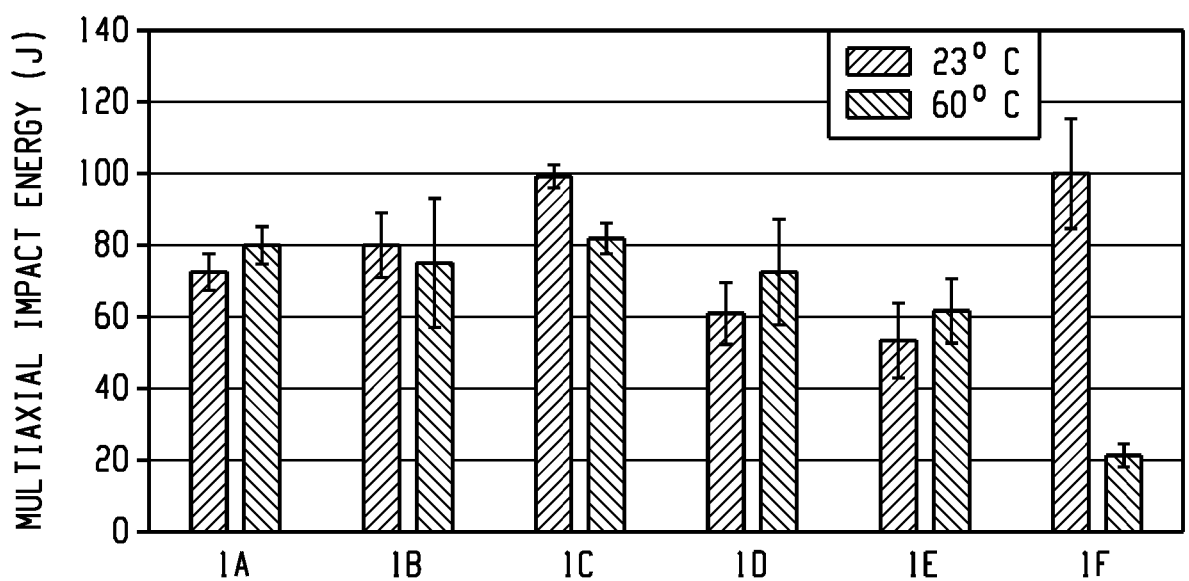
FIG. 2 is a graphical illustration of the multiaxial impact energy of the compositions of Example 1.

FIG. 1 shows that Compositions 1A-1E comprising the polycarbonate-polysiloxane copolymer resulted in a significantly increased notched Izod impact as compared to Composition 1F at both 23° C. and −60° C. FIG. 2 shows that Composition 1C, comprising 3 wt % of the nanosilica, had a significantly increased multiaxial impact energy at 23° C. as compared to the other compositions. Example 1 therefore illustrates that Composition 1C was able to achieve the increased notched Izod impact as well as a surprising increase in the multiaxial impact energy at 23° C.

Figure 3:
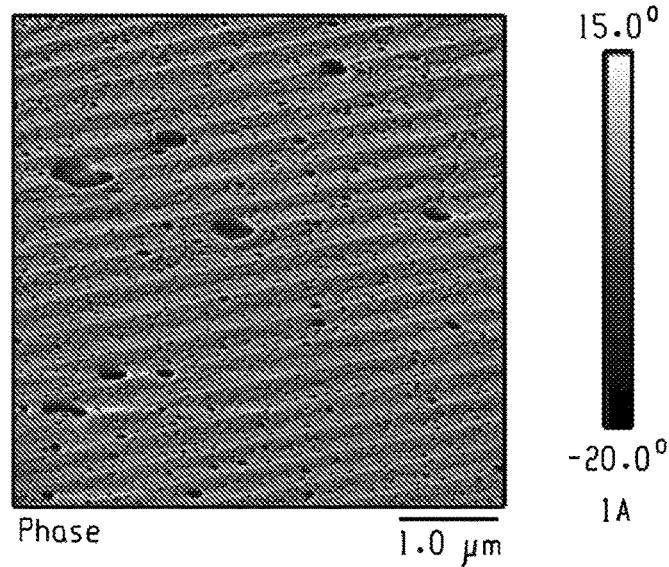
FIG. 3 is an atomic force microscopy (AFM) image of Composition 1A of Example 1.
Figure 4:
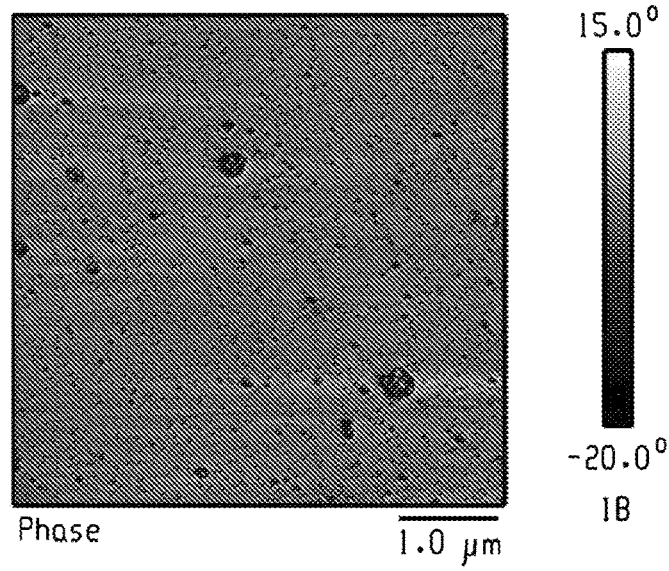
FIG. 4 is an atomic force microscopy image of Composition 1B of Example 1.
Figure 5:
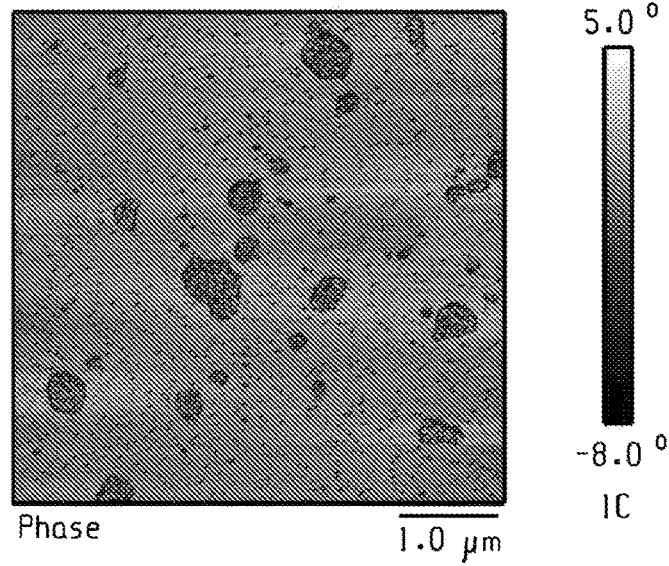
FIG. 5 is an atomic force microscopy image of Composition 1C of Example 1.

In order to understand the morphology of the compositions, atomic force microscopy images were taken on Compositions 1A, 1B, and 1C and are shown in FIG. 3, FIG. 4, and FIG. 5, respectively. FIG. 5 shows that Composition 1C comprises siloxane domains having increased sizes of more than 600 nanometers as compared to Composition 1A and Composition 1B that comprise siloxane domains having maximum domain sizes of only 200 nanometers. Without intending to be bound by theory, it is believed that the hydrophobic coating and the increased amount of nanosilica in Composition 1C allows for an amount of the nanosilica to migrate into the siloxane domains, swelling and coalescing neighboring domains to achieve the increased size, which ultimately results in the surprising increase in the multiaxial impact energy at room temperature. Composition 1B, comprising only 1 wt % of the nanosilica does not result in the same swelling of the siloxane domains and the domains are observed in FIG. 4 to be approximately the same size as those observed in FIG. 3.

Further, and also without intending to be bound by theory, it is noted that if the value of E of the siloxane domain of formula 10 of the polycarbonate-polysiloxane copolymer was reduced to less than 40, for example, to a value of 10 to 30, the size of the siloxane domains would not have been large enough to experience a similar swelling and is not expected achieve the increase in multiaxial impact energy at room temperature as was discovered in Composition 1C.

Example 2: Effect of Nanosilica on Impact Energy of Compositions Comprising the Polysiloxane Particles Nine compositions were prepared according to Table 3. The notched Izod impact energy and the tensile modulus of each composition were determined and the results are shown in FIG. 6 and FIG. 7, respectively.

TABLE 3

| Composition | 2A | 2B | 2C | 2D | 2E | 2F | 2G | 2H | 2I |
|---|---|---|---|---|---|---|---|---|---|
| PC175 (wt %) | 99.95 | 97.95 | 94.95 | 98.95 | 96.95 | 96.95 | 94.95 | 93.95 | 91.95 |
| SNP-TOS-2 (wt %) | — | 2 | 5 | — | — | 2 | 2 | 5 | 5 |
| Nanosilica (wt %) | — | — | — | 1 | 3 | 1 | 3 | 1 | 3 |
| Irgaphos (wt %) | 0.05 | 0.05 | 0.05 | 0.05 | 0.05 | 0.05 | 0.05 | 0.05 | 0.05 |

Figure 6:
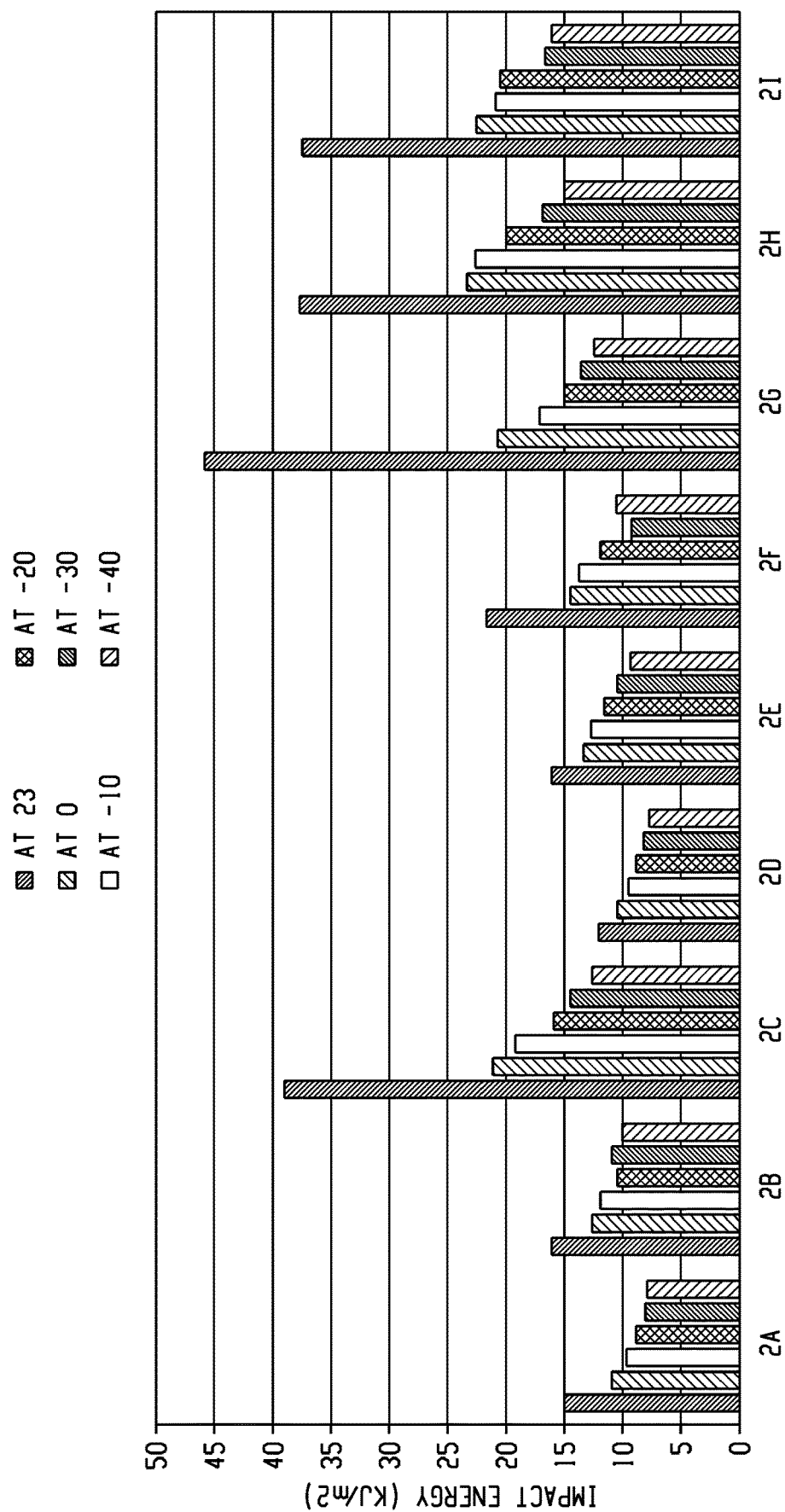
FIG. 6 is a graphical illustration of the notched Izod impact energy of the compositions of Example 2.
Figure 7:
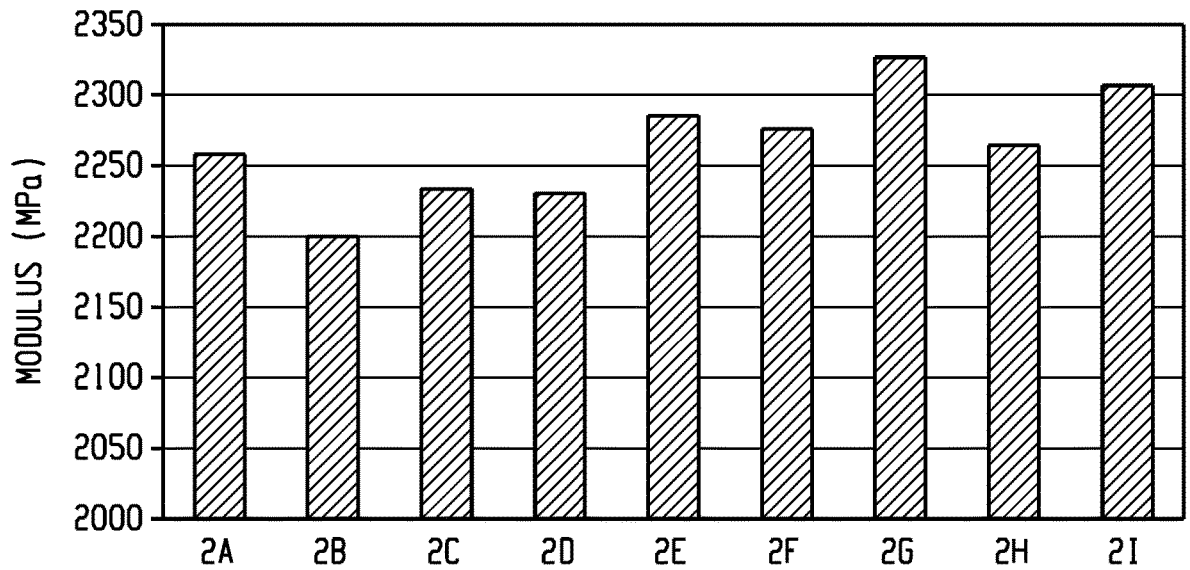
FIG. 7 is a graphical illustration of the tensile modulus of the compositions of Example 2.

FIG. 6 and FIG. 7 illustrate that there is a surprising synergy that arises from compositions comprising the nanosilica and the polysiloxane particles. Specifically, Composition 2B and Composition 2C comprising only the polycarbonate and the polysiloxane particles have the same or increased impact energy as compared to Composition 2A, but have significantly decreased tensile moduli. Neither Composition 2D nor Composition 2E comprising only the polycarbonate and the nanosilica resulted in a significant increase in the impact energy. Compositions 2F-2I comprising both the polysiloxane particles and the nanosilica all resulted in significant increases in impact energy and similar or increased tensile moduli. In other words, the presence of both the nanosilica and the polysiloxane particles resulted in a surprising synergy that results in an improved impact energy, while maintaining or increasing the modulus.

Figure 8:
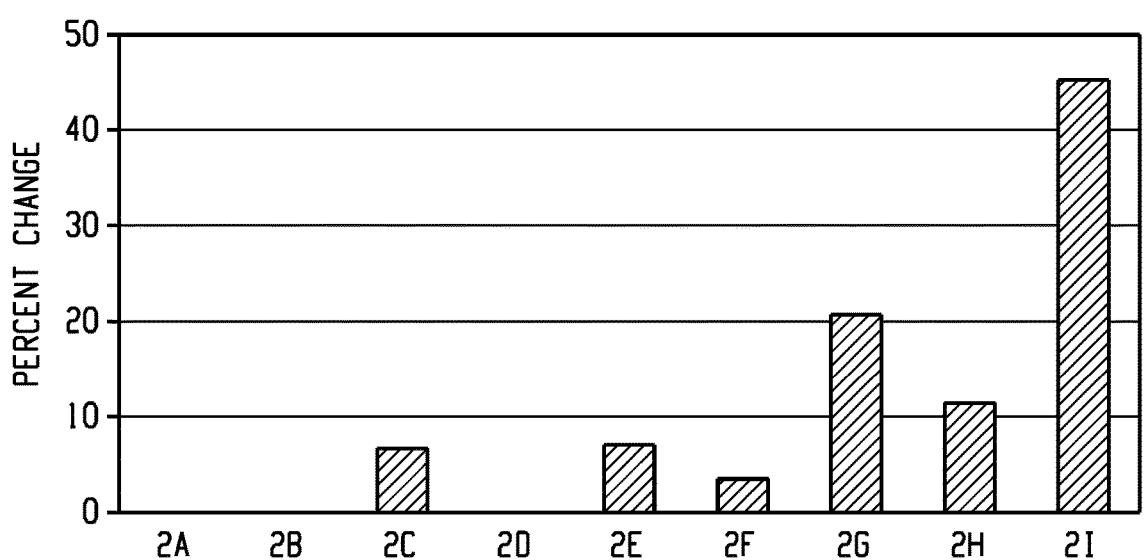
FIG. 8 is a graphical illustration of the an increase in viscosity relative to Composition 1A of Example 2.

The rheological properties of Compositions 2A-2I were determined in accordance with ISO-6721-10:2015. The viscosity determined for each of the compositions relative to that measured for Composition 2A is illustrated in FIG. 8. FIG. 8 shows that Compositions 2F-2I all resulted in an increase in viscosity relative to Composition 1A, where Compositions 2G-2I resulted in increases of more than 10%. The increased viscosity of the compositions indicate that these compositions could be used in 3D printing applications, such as fuse deposition modeling or selective laser sintering.

Atomic force microscopy of a composition comprising a BPA homopolycarbonate, 2 wt % of the nanosilica, and 5 wt % of the polysiloxane particles show that the nanosilica is not present in the silica domains and instead remains well dispersed throughout the polycarbonate. Without being bound by theory, it is believed that the heavy crosslinking of the polysiloxane particles prevents the nanosilica from entering them.

Further compositions comprising 98 wt % of the BPA homopolycarbonate and 2 wt % of polysiloxane particles with varying particle size and varying surface coating were prepared according to Table 4.

TABLE 4

| | Composition | | | | | | | | |
|---|---|---|---|---|---|---|---|---|---|
| | 2K | 2L | 2M | 2N | 2O | 2P | 2Q | 2R | 2S |
| | | | | Polysiloxaneparticle | | | | | |
| | — | TOS-2 | TOS-3 | TOS-4.5 | 30-1-3 | E-0.8 | E-2 | E-4 | E-15 |
| 23° C. | 11.4 | 18.6 | 15.5 | 11.3 | 7.1 | 7.7 | 8.6 | 9.2 | 8.4 |
| 10° C. | 10.2 | 17.1 | 13.7 | 11.2 | 7.3 | 7.6 | 8.9 | 8.7 | 8.3 |
| 0° C. | 10.9 | 15.2 | 13.1 | 11.1 | 7.1 | 7.5 | 8.2 | 9.5 | 8.8 |
| −10° C. | 10.0 | 13.8 | 12.5 | 10.2 | 7.3 | 8.0 | 8.4 | 9.2 | 8.7 |
| −20° C. | 8.9 | 11.9 | 11.3 | 10 | 7.4 | 7.6 | 8.2 | 8.6 | 8.5 |
| −30° C. | 8.9 | 11.8 | 10.9 | 9.8 | 7.5 | 7.8 | 8.0 | 8.3 | 8.2 |

Further compositions comprising 95 wt % of the BPA homopolycarbonate, 3 wt % of the nanosilica, and 2 wt % of polysiloxane particles with varying particle size and varying surface coating were prepared according to Table 5.

TABLE 5

| | Composition | | | | | | | |
|---|---|---|---|---|---|---|---|---|
| | 2T | 2U | 2V | 2W | 2X | 2Y | 2Z | 2AA |
| | | | Polysiloxane particle | | | | | |
| | TOS-2 | TOS-3 | TOS-4.5 | 30-1-3 | E-0.8 | E-2 | E-4 | E-15 |
| 23° C. | 26.5 | 21 | 16.1 | 8.6 | 10.7 | 9.1 | 13.1 | 11.8 |
| 10° C. | 19.8 | 19.5 | 14.6 | 7.9 | 11 | 8.7 | 12.2 | 11.5 |
| 0° C. | 18.5 | 16.6 | 13.4 | 7.7 | 10.9 | 8.6 | 11.4 | 10.2 |
| −10° C. | 16.5 | 15.0 | 13.1 | 8.0 | 10.1 | 9.0 | 10.5 | 10.0 |
| −20° C. | 13.9 | 13.4 | 11.3 | 7.1 | 9.1 | 8.7 | 10.3 | 9.3 |
| −30° C. | 12.6 | 12.6 | 11.1 | 7.0 | 8.0 | 8.3 | 9.9 | 9.2 |

In comparing Table 4 with Table 5, it is observed that the compositions comprising both the nanosilica and the polysiloxane particles had increased notched Izod impact values at all temperature, see for example, Examples 2T and 2L, 2M and 2U, 2N and 2V, etc. Table 5 further shows that the polysiloxane particles having a methylated coating and particle sizes of 0.5 to 5 micrometers had significantly increased notched Izod impact values at all temperatures as compared to the polysiloxane particles having a methoxy coating.

Example 3: Effect of a Fluoropolymer on Impact Energy of Compositions Comprising the Polysiloxane Particles and the Nanosilica Ten compositions were prepared according to Table 6. The notched Izod impact energy at 23° C. and the tensile modulus for each composition were determined and the results are shown in FIG. 9 and FIG. 10, respectively.

TABLE 6

| Composition | 3A | 3B | 3C | 3D | 3E | 3F | 3G | 3H | 3I | 3J* |
|---|---|---|---|---|---|---|---|---|---|---|
| FST3403 (wt %) | 100 | 100 | 99.5 | 99 | 99.5 | 99 | 97.5 | 95 | 95 | 94 |
| SNP-TOS-2 (wt %) | — | — | — | — | — | — | — | — | 2 | 2 |
| Nanosilica (wt %) | — | — | — | — | — | — | — | — | 3 | 3 |
| PTFE (wt %) | — | — | 0.5 | 1 | — | — | — | — | — | — |
| TSAN (wt %) | — | — | — | — | 0.5 | 1 | 2.5 | 5 | — | 1 |

Figure 9:
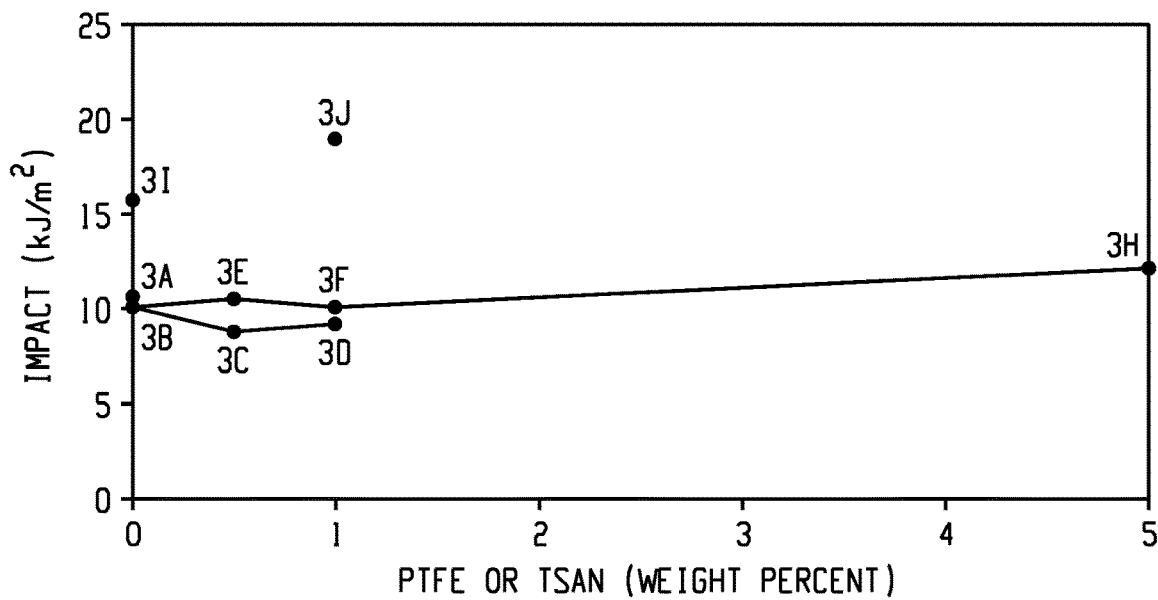
FIG. 9 is a graphical illustration of the notched Izod impact energy of the compositions of Example 3 with increasing weight percent of fluoropolymer.
Figure 10:
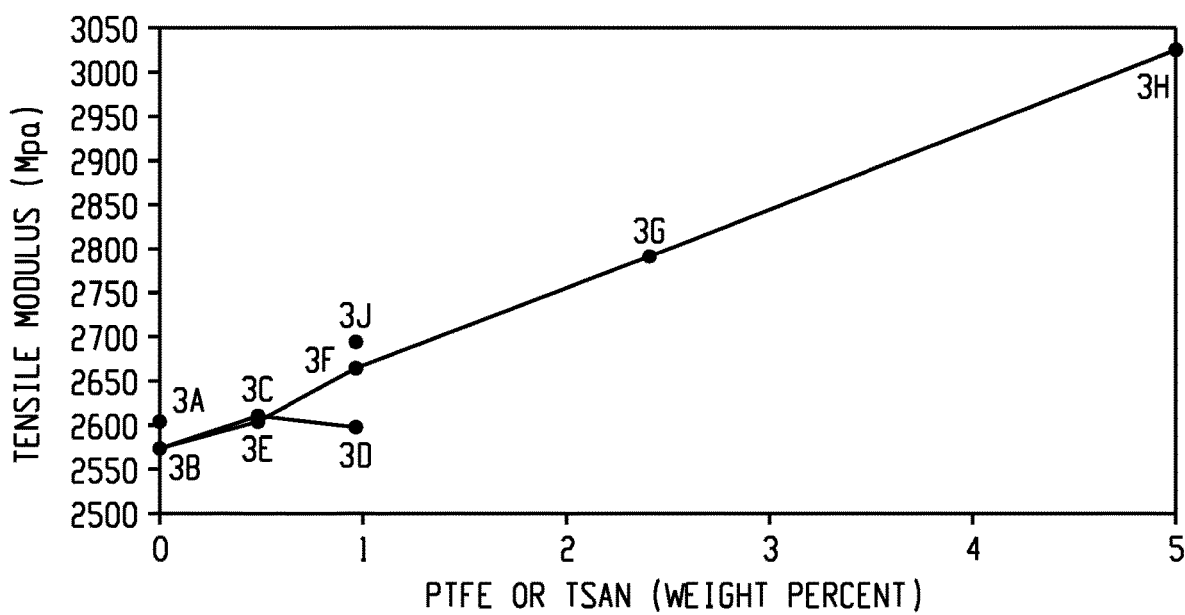
FIG. 10 is a graphical illustration of the tensile moduli of the compositions of Example 3 with increasing weight percent of fluoropolymer.

FIG. 9 and FIG. 10 show that there is a significant increase in the notched Izod impact energy of Composition 3J comprising the TSAN, the nanosilica, and the Tospearl while maintaining a similar or slightly increased tensile modulus value at the same loading.

Two further compositions were prepared according to Table 7. Crack propagation studies and composition fatigue testing were performed on Compositions 3K and 3L and the results are shown in FIG. 11 and FIG. 12, respectively.

TABLE 7

| Composition | 3K | 3L* |
|---|---|---|
| FST3403 (wt %) | 100 | 93 |
| SNP-TOS-2 (wt %) | — | 2 |
| Nanosilica (wt %) | — | 3 |
| TSAN (wt %) | — | 2 |

Figure 11:
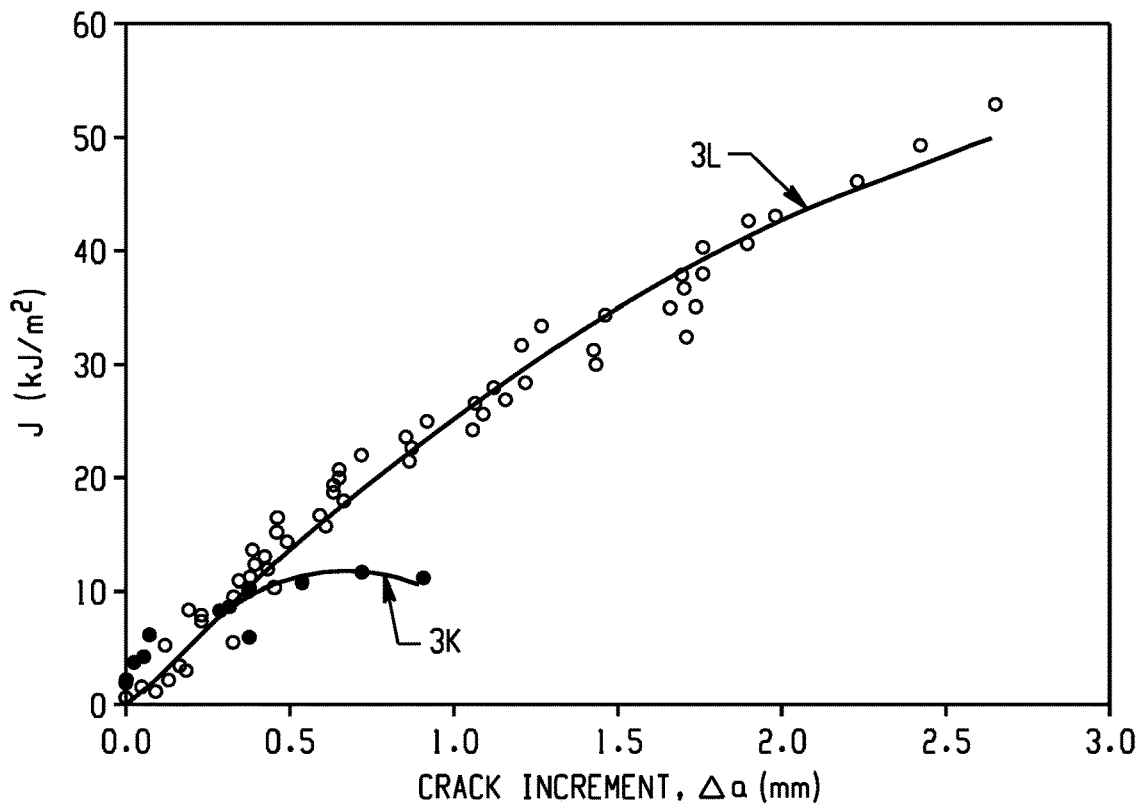
FIG. 11 is a graphical illustration of the crack propagation study of Example 3.
Figure 12:
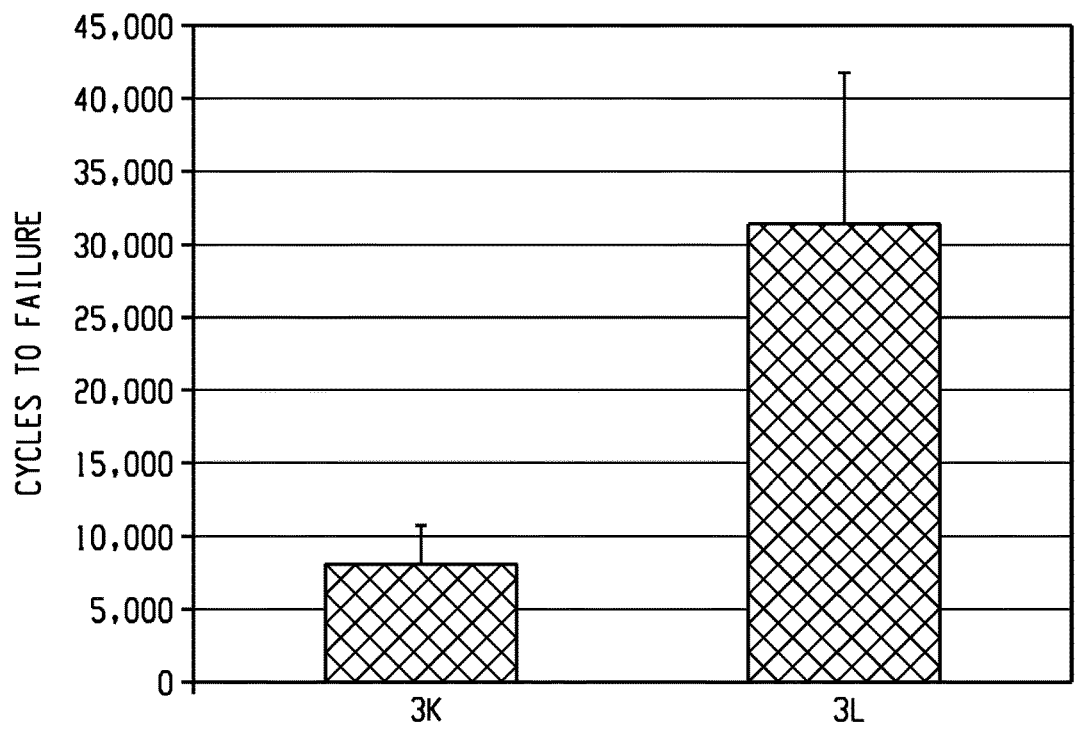
FIG. 12 is a graphical illustration of the fatigue testing of Example 3.

FIG. 11 shows that there was 6-fold increase in the crack propagation resistance as demonstrated by the slope of the J-R curves. FIG. 12 shows that there is a significant increase in the number of cycles to failure in comparing Composition 3K to Composition 3L from 8,018±2,523 cycles to 31,491±10,291 cycles.

Figure 13:
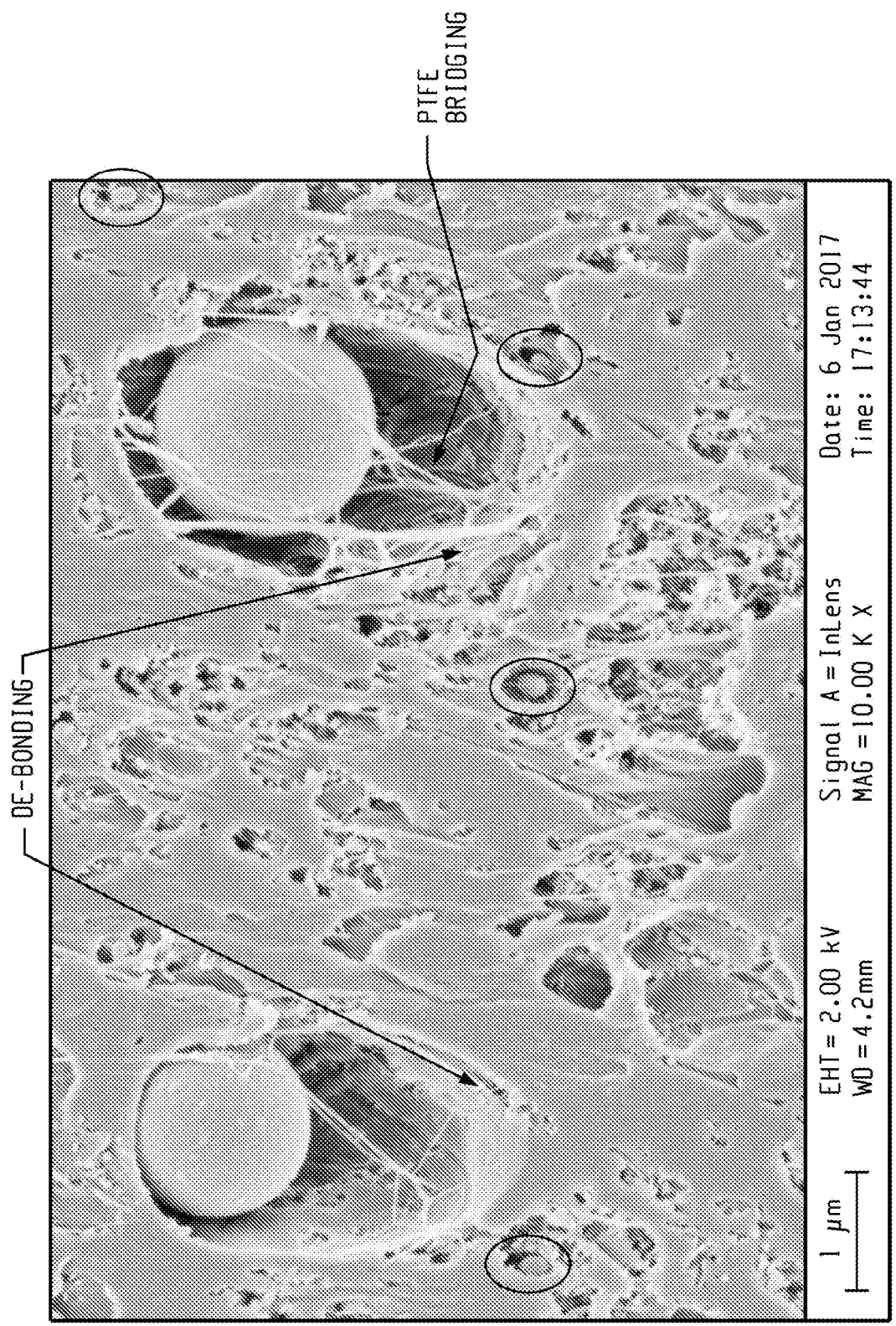
FIG. 13 is a scanning electron microscopy image of Composition 3L of Example 3.

A scanning electron microscopy image of Composition 3L after fatigue testing near the location of the fracture edge is shown in FIG. 13. FIG. 13 shows that the TSAN in the composition forms fibrils that connect both the polysiloxane particles and the nanosilica to the polycarbonate domain Without intending to be bound by theory, it is believed that the fibril bridging helps to slow crack propagation, debonding of the polysiloxane particles, and cavitation, which likely ultimately results in the improved failure properties of the composition.

Example 4: Effect of Carbon Nanotubes on Impact Energy of Compositions Comprising the Polysiloxane Homopolymer and the Nanosilica Five compositions were prepared according to Table 8 and the notched Izod impact energy and conductivity results are provided. In Table 8, SVR is the specific volume resistivity and was measured using a multimeter on the silver painted edges of an ISO-527:2012 tensile bar, of which the end sections are broken off, leaving a middle section of about 8 centimeters, 10 mm wide, and 4 mm high.

TABLE 8

| Composition | 4A | 4B | 4C | 4D | 4E |
|---|---|---|---|---|---|
| PC125 (wt %) | 97 | 96.5 | 99 | 97 | 93 |
| Polysiloxane (wt %) | — | 0.5 | 1 | — | 1 |
| Nanosilica (wt %) | — | — | — | 3 | 3 |
| Carbon nano tubes (wt %) | 3 | 3 | 3 | 3 | 3 |
| Impact at 23° C. (kJ/m$^2$) | 10 | 12 | 13 | 12 | 19 |
| SVR (Ohm · cm) | 22 | 29 | 20 | 19 | 18 |

Table 8 shows that the presence of the carbon nanotubes significantly improves impact properties without sacrificing electrical conductivity of the material.

Set forth below are various, non-limiting aspects of the present disclosure.

Aspect 1: A composition comprising: a polycarbonate; 1 to 5 wt % based on a total weight of the composition of a nanosilica having a $D_{50}$ particle size by volume of 5 to 50 nanometers; wherein the nanosilica has a hydrophobic coating; and a siloxane domain having repeat units of the formula 10; wherein each R is independently a $C_{1-13}$ monovalent organic group and the value of E is 2 to 1,000; wherein the composition comprises at least one of a polycarbonate-polysiloxane copolymer, 0.1 to 5 wt % of a polysiloxane homopolymer based on the total weight of the composition, or a plurality of polysiloxane particles having a $D_{50}$ particle size by volume of 0.1 to 10 micrometers. If present, the polysiloxane portion of the polycarbonate-polysiloxane copolymer constitutes at least a portion of the siloxane domain, the nanosilica is present in an amount of 2 to 5 wt %, and the value of E of formula (10) is 40 to 80, wherein the polycarbonate-polysiloxane copolymer can be the same or different as the polycarbonate. If present, the polysiloxane homopolymer constitutes at least a portion of the siloxane domain. If present, the plurality of polysiloxane particles constitutes at least a portion of the siloxane domain.

Aspect 2: The composition of Aspect 1, wherein the composition has an increased notched Izod impact energy at 23° C. as compared to the same composition but that is free of one of the nanosilica or the siloxane domain.

Aspect 3: The composition of any one or more of the preceding aspects, wherein the composition comprises 60 to 90 wt %, or 65 to 75 wt % of the polycarbonate based on the total weight of the composition.

Aspect 4: The composition of any one or more of the preceding aspects, wherein the polycarbonate comprises a bisphenol A homopolycarbonate.

Aspect 5: The composition of any one or more of the preceding aspects, wherein the polycarbonate has a weight average molecular weight of 10,000 to 50,000 g/mol based on polycarbonate standards.

Aspect 6: The composition of any one or more of the preceding aspects, wherein the composition comprises 2.5 to 4.5 wt %, or 3 to 4 wt % of the nanosilica based on the total weight of the composition.

Aspect 7: The composition of any one or more of the preceding aspects, wherein the nanosilica has a $D_{50}$ particle size by volume of 5 to 40 nm, or 15 to 25 nm.

Aspect 8: The composition of any one or more of the preceding aspects, wherein the hydrophobic coating comprises a polysiloxane graft.

Aspect 9: The composition of any one or more of the preceding aspects, wherein the composition comprises 3 to 15 wt % of the siloxane domain based on the total weight of the composition.

Aspect 10: The composition of any one or more of the preceding aspects, wherein the composition comprises the polycarbonate-polysiloxane copolymer.

Aspect 11: The composition of any one or more of the preceding aspects, wherein the composition comprises 10 to 40 wt %, or 25 to 35 wt % of the polycarbonate-polysiloxane copolymer based on the total weight of the composition.

Aspect 12: The composition of any one or more of the preceding aspects, wherein the composition comprises the polysiloxane homopolymer; wherein the polysiloxane homopolymer optionally comprises a polydimethylsiloxane.

Aspect 13: The composition of any one or more of the preceding aspects, wherein the composition comprises 0.1 to 3 wt %, or 0.5 to 1.5 wt % of the polysiloxane homopolymer based on the total weight of the composition.

Aspect 14: The composition of any one or more of the preceding aspects, wherein the composition further comprises a plurality of carbon nanotubes.

Aspect 15: The composition of any one or more of the preceding aspects, wherein the composition comprises 2 to 10 wt % of a plurality of carbon nanotubes based on the total weight of the composition.

Aspect 16: The composition of any one or more of the preceding aspects, wherein the composition comprises the plurality of polysiloxane particles.

Aspect 17: The composition of any one or more of the preceding aspects, wherein the composition comprises 1 to 10 wt %, or 2 to 6 wt % of the plurality of polysiloxane particles.

Aspect 18: The composition of any one or more of the preceding aspects, wherein the plurality of polysiloxane particles has a $D_{50}$ particle size of 1 to 5 micrometers.

Aspect 19: The composition of any one or more of the preceding aspects, wherein the plurality of polysiloxane particles has a methylated coating.

Aspect 20: The composition of any one or more of the preceding aspects, further comprising an encapsulated fluoropolymer, wherein the encapsulated fluoropolymer optionally comprises a styrene acrylonitrile encapsulated polytetrafluoroethylene.

Aspect 21: The composition of any one or more of the preceding aspects, further comprising a fibrillated fluoropolymer having an average fibril diameter of greater than or equal to 20 nm, or 20 to 200 nm, or 5 to 500 nm, or 10 to 200 nm, or 20 to 100 nm. The fibrillated fluoropolymer can comprise the encapsulated fluoropolymer of Aspect 20.

Aspect 22: The composition of any one or more of the preceding aspects, wherein the siloxane domain has an average maximum diameter as determined by image analysis of atomic force microscopy images of greater than or equal to 500 nm, or 500 to 5,000 nm, or 600 to 2,000 nm, where the diameter is the diameter of a circle having the same area as the area of the siloxane domain.

The compositions, methods, and articles can alternatively comprise, consist of, or consist essentially of, any appropriate materials, steps, or components herein disclosed. The compositions, methods, and articles can additionally, or alternatively, be formulated so as to be devoid, or substantially free, of any materials (or species), steps, or components, that are otherwise not necessary to the achievement of the function or objectives of the compositions, methods, and articles.

The terms "a" and "an" do not denote a limitation of quantity, but rather denote the presence of at least one of the referenced item. The term "or" means "and/or" unless clearly indicated otherwise by context. Reference throughout the specification to "an embodiment", "another embodiment", "some embodiments", "an aspect", and so forth, means that a particular element (e.g., feature, structure, step, or characteristic) described in connection with the embodiment is included in at least one embodiment described herein, and may or may not be present in other embodiments. In addition, it is to be understood that the described elements may be combined in any suitable manner in the various embodiments or aspects. "Optional" or "optionally" means that the subsequently described event or circumstance may or may not occur, and that the description includes instances where the event occurs and instances where it does not.

Unless specified to the contrary herein, all test standards are the most recent standard in effect as of the filing date of this application, or, if priority is claimed, the filing date of the earliest priority application in which the test standard appears.

The endpoints of all ranges directed to the same component or property are inclusive of the endpoints, are independently combinable, and include all intermediate points and ranges. For example, ranges of "up to 25 wt %, or 5 to 20 wt %" is inclusive of the endpoints and intermediate values of the ranges of "5 to 25 wt %," such as 10 to 23 wt %, etc.

The term "combination" is inclusive of blends, mixtures, alloys, reaction products, and the like. Also, "a combination comprising at least one of the foregoing" or "at least one of" means that the list is inclusive of each element individually, as well as combinations of two or more elements of the list, and combinations of at least one element of the list with like elements not named.

Unless defined otherwise, technical and scientific terms used herein have the same meaning as is commonly understood by one of skill in the art to which this invention belongs.

Compounds are described using standard nomenclature. For example, any position not substituted by any indicated group is understood to have its valency filled by a bond as indicated, or a hydrogen atom. A dash ("-") that is not between two letters or symbols is used to indicate a point of attachment for a substituent. For example, —CHO is attached through carbon of the carbonyl group.

When a group containing a specified number of carbon atoms is substituted with any of the groups listed in the preceding paragraph, the number of carbon atoms in the resulting "substituted" group is defined as the sum of the carbon atoms contained in the original (unsubstituted) group and the carbon atoms (if any) contained in the substituent. For example, when the term "substituted $C_{1-10}$ alkyl" refers to a $C_{1-10}$ alkyl group substituted with $C_{6-12}$ aryl group, the total number of carbon atoms in the resulting aryl-substituted alkyl group is $C_{7-22}$.

All cited patents, patent applications, and other references are incorporated herein by reference in their entirety. However, if a term in the present application contradicts or conflicts with a term in the incorporated reference, the term from the present application takes precedence over the conflicting term from the incorporated reference.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

What is claimed is:

1. A composition comprising:
   a polycarbonate;
   1 to 5 wt % based on a total weight of the composition of a nanosilica having a $D_{50}$ particle size by volume of 5 to 50 nanometers determined in accordance with ISO-22412-17; wherein the nanosilica has a hydrophobic coating; and
   a siloxane domain having repeat units of the formula 10;

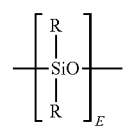

wherein each R is independently a $C_{1-13}$ monovalent organic group and the value of E is 2 to 1,000;
wherein the composition comprises at least one of
   a polycarbonate-polysiloxane copolymer, wherein, if present, the polysiloxane portion of the polycarbonate-polysiloxane copolymer constitutes at least a portion of the siloxane domain, and the value of E of formula (10) is 40 to 80, wherein the polycarbonate-polysiloxane copolymer can be the same or different as the polycarbonate; or
   a plurality of polysiloxane particles having a $D_{50}$ particle size by volume of 0.1 to 10 micrometers determined in accordance with ISO-22412-17, wherein, if present, the plurality of polysiloxane particles constitutes at least a portion of the siloxane domain.

2. The composition of claim 1, wherein the composition comprises 10 to 40 wt % of the polycarbonate-polysiloxane copolymer based on the total weight of the composition.

3. The composition of claim 1, wherein the composition comprises 1 to 10 wt % of the plurality of polysiloxane particles.

4. The composition of claim 1, wherein the composition comprises the plurality of polysiloxane particles and the plurality of polysiloxane particles has a $D_{50}$ particle size of 1 to 5 micrometers.

5. A composition comprising:
   a polycarbonate;
   1 to 5 wt % based on a total weight of the composition of a nanosilica having a $D_{50}$ particle size by volume of 5 to 50 nanometers; wherein the nanosilica has a hydrophobic coating;

a plurality of carbon nanotubes; and 0.1 to 5 wt % of a polysiloxane homopolymer having a siloxane domain having repeat units of the formula 10 based on the total weight of the composition;

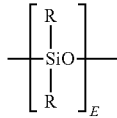
(10)

wherein each R is independently a $C_{1-13}$ monovalent organic group and the value of E is 2 to 1,000.

6. The composition of claim 5, wherein the polysiloxane homopolymer comprises a polydimethylsiloxane.

7. The composition of claim 5, wherein the composition comprises 0.1 to 3 wt % of the polysiloxane homopolymer based on the total weight of the composition.

8. The composition of claim 5, wherein the composition comprises 2 to 10 wt % of the plurality of carbon nanotubes based on the total weight of the composition.

9. The composition of claim 1, wherein the composition has an increased notched Izod impact energy at 23° C. as compared to the same composition but that is free of one of the nanosilica or the siloxane domain.

10. The composition of claim 1, wherein the composition comprises 60 to 90 wt % of the polycarbonate based on the total weight of the composition.

11. The composition of claim 1, wherein the polycarbonate comprises a bisphenol A homopolycarbonate.

12. The composition of claim 1, wherein the composition comprises 2.5 to 4.5 wt % of the nanosilica based on the total weight of the composition.

13. The composition of claim 1, wherein the nanosilica has a $D_{50}$ particle size by volume of 5 to 40 nm.

14. The composition of claim 1, wherein the composition comprises 3 to 15 wt % of the siloxane domain based on the total weight of the composition.

15. The composition of claim 1, further comprising an encapsulated fluoropolymer, wherein the encapsulated fluoropolymer optionally comprises a styrene acrylonitrile encapsulated polytetrafluoroethylene.

* * * * *